United States Patent [19]
Byrne

[11] Patent Number: 4,527,151
[45] Date of Patent: Jul. 2, 1985

[54] METHOD AND APPARATUS FOR INTRUSION DETECTION

[75] Inventor: George C. Byrne, Los Altos, Calif.

[73] Assignee: SRI International, Menlo Park, Calif.

[21] Appl. No.: 374,181

[22] Filed: May 3, 1982

[51] Int. Cl.$^3$ .............................................. G01S 13/52
[52] U.S. Cl. ................................. 340/554; 343/5 PD; 343/7.7
[58] Field of Search ............. 340/554; 343/5 PD, 7.7; 367/94

[56] References Cited

U.S. PATENT DOCUMENTS

| | | | |
|---|---|---|---|
| 3,242,486 | 3/1966 | Corbell | 343/5 PD X |
| 3,327,307 | 6/1967 | Miles | 367/94 X |
| 3,803,599 | 4/1974 | McLean et al. | 343/5 PD |
| 3,815,131 | 6/1974 | Dautel et al. | 343/5 PD |
| 3,859,656 | 1/1975 | Klein et al. | 343/5 PD |
| 3,967,283 | 6/1976 | Clark et al. | 340/554 |

FOREIGN PATENT DOCUMENTS 1554661 10/1979 United Kingdom ............. 343/5 PD

Primary Examiner—Jerry W. Myracle
Attorney, Agent, or Firm—Victor R. Beckman

[57] ABSTRACT

CW intrusion detection method and apparatus are shown comprising first and second CW Doppler radar systems which include first and second antennas, respectively. The first antenna is located adjacent ground level for illumination of a protected area adjacent the ground. The second antenna is located directly above the first antenna a spaced distance therefrom, and illuminates the same protected area adjacent the ground. In response to movement of an intruder along the ground in the protected area, first and second Doppler difference frequency signals are obtained from the first and second radar systems. Using the first and second Doppler difference frequency signals, a signal proportional to distance of the moving intruder from the first antenna is generated. Memory elements for storage of combinations of amplitude, range and/or velocity criteria signals are provided and, when the signal proportional to distance and at least one of the first and second Doppler difference frequency signals match the criteria signals, an alarm signal is produced.

20 Claims, 10 Drawing Figures

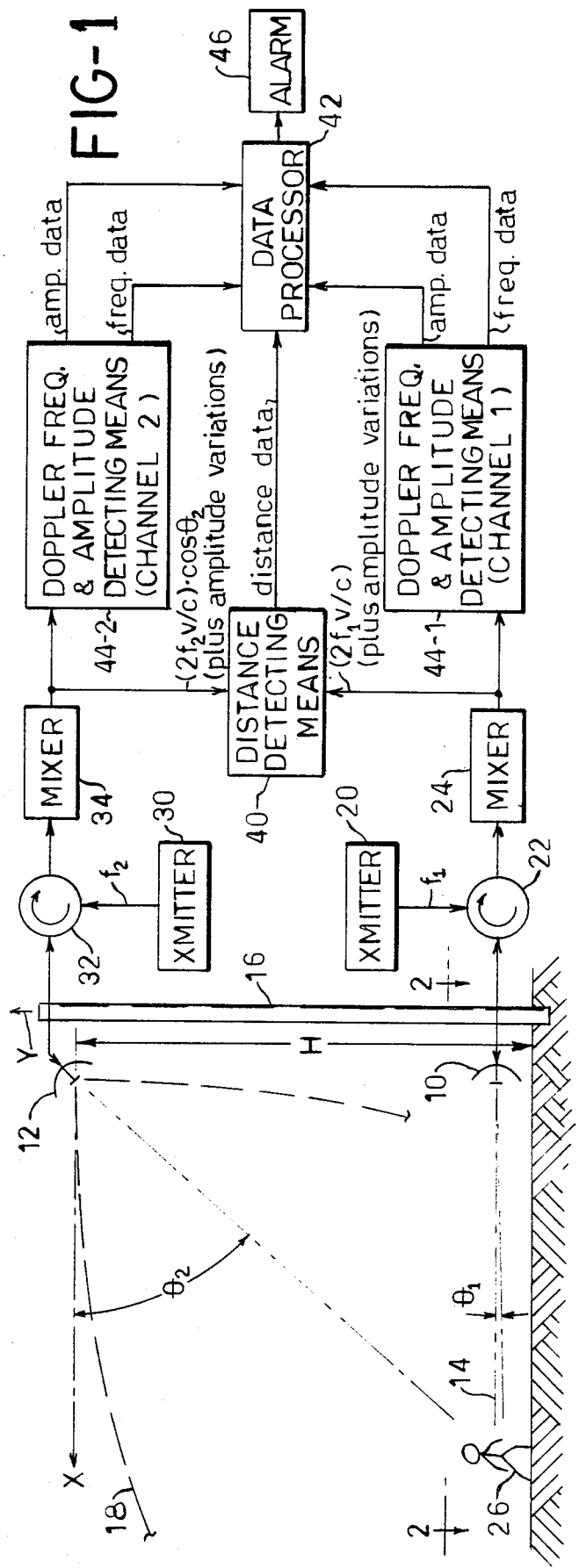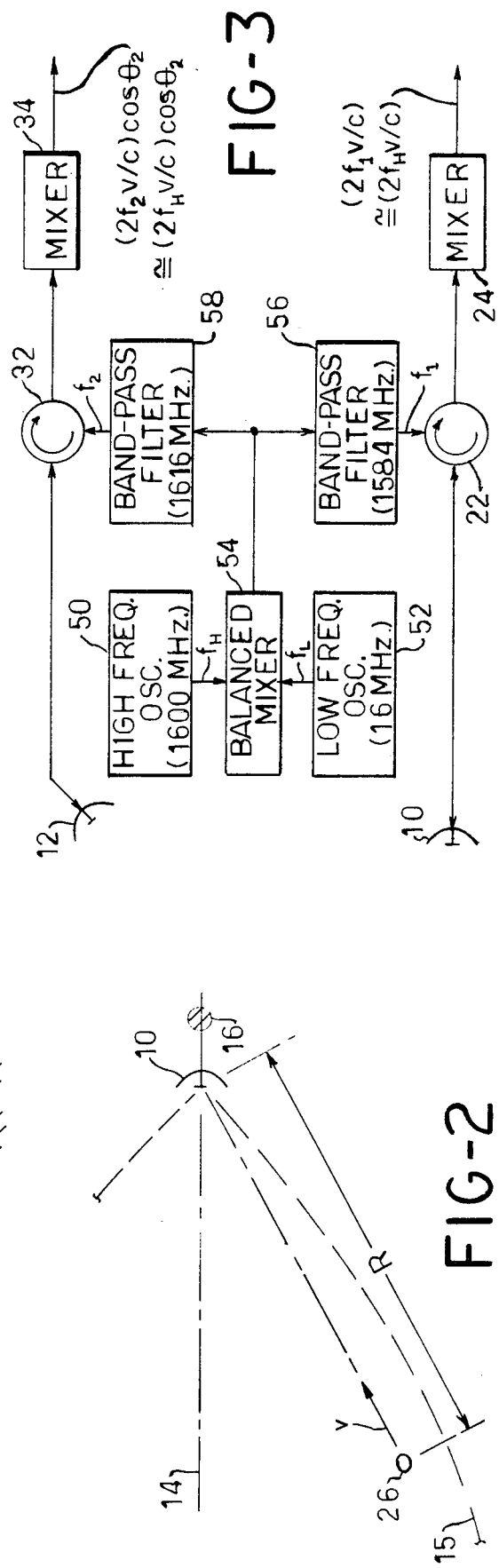

FIG-6
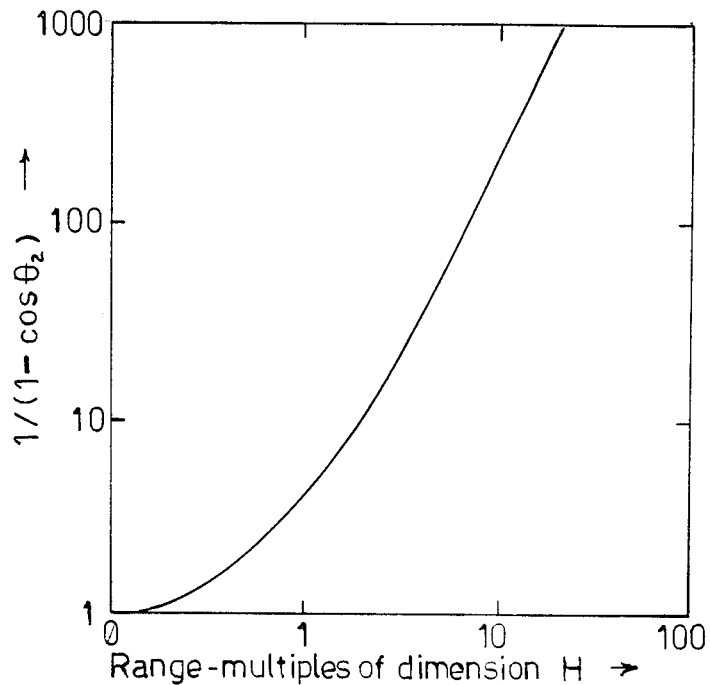
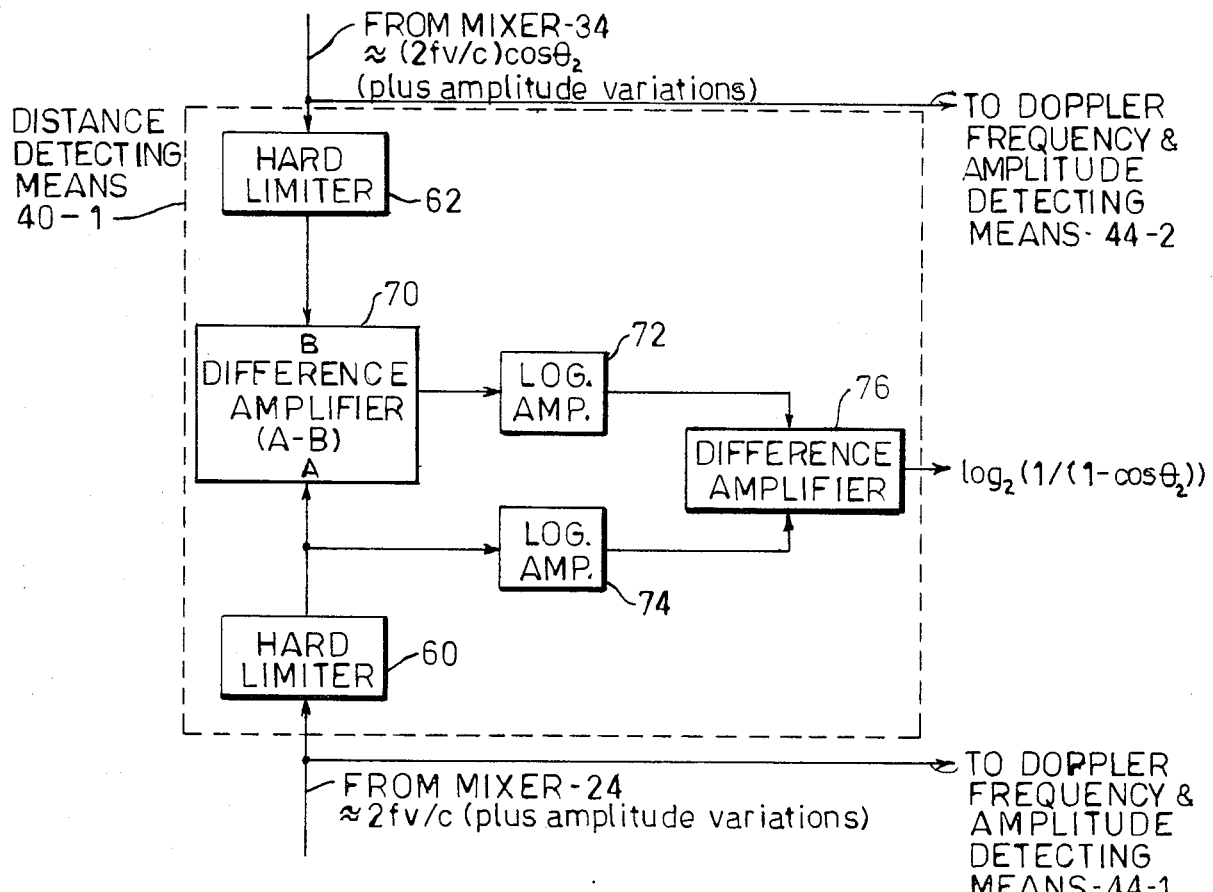
FIG-7

FIG-8
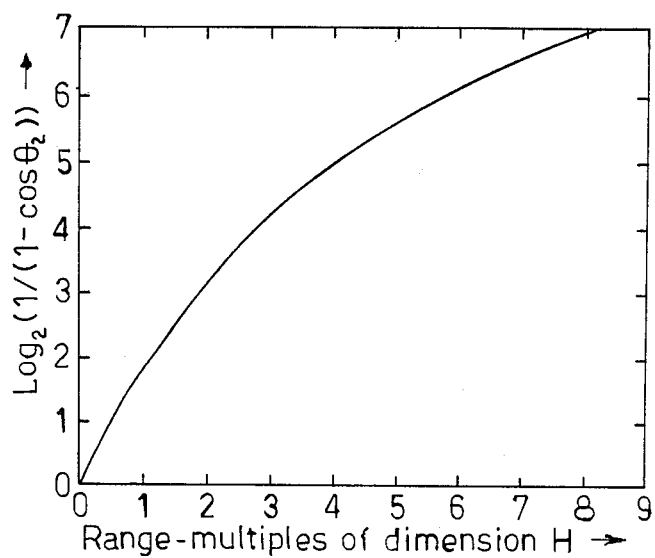
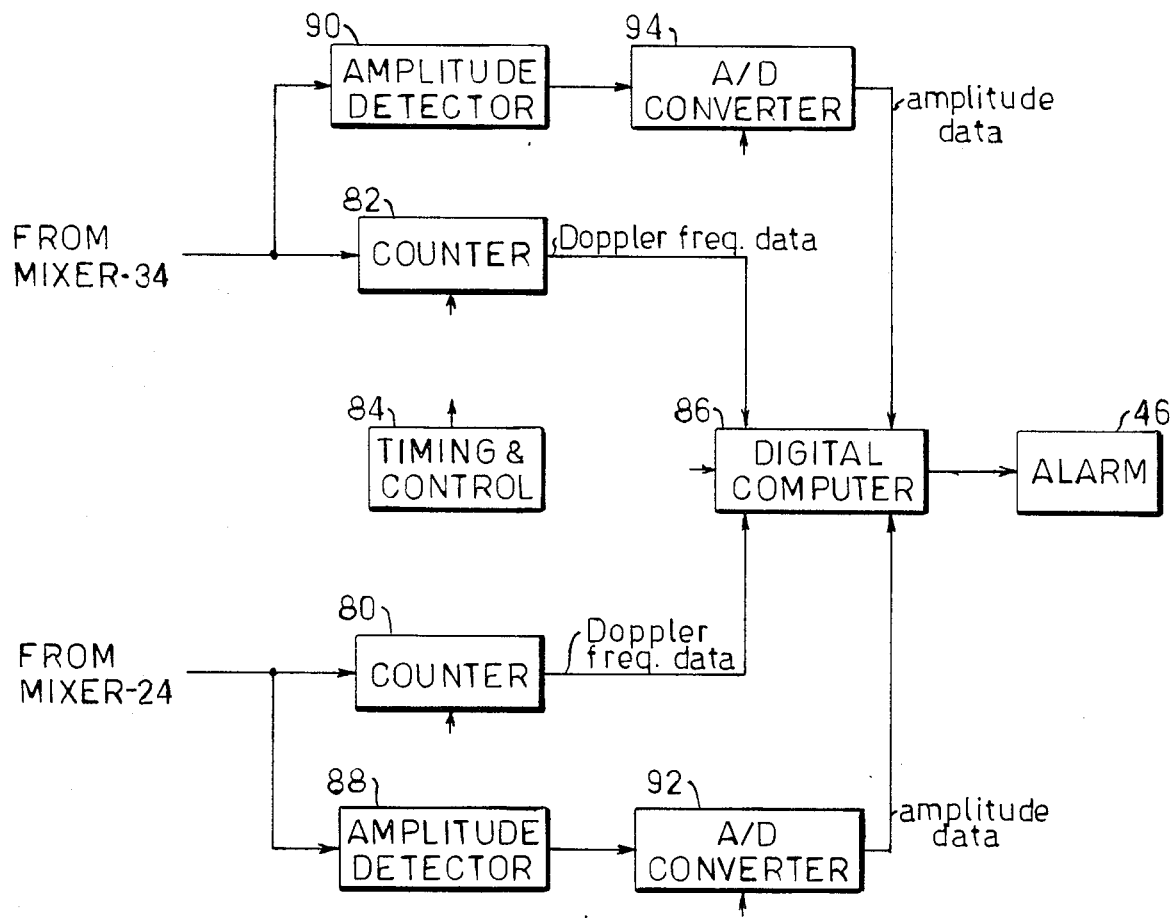
FIG-9

METHOD AND APPARATUS FOR INTRUSION DETECTION

BACKGROUND OF THE INVENTION

Intrusion detection systems for detecting and signaling an alarm if a person or persons intrude into a surveillance area are well known. Optical, infrared, seismic, sonic, radar, and like sensing techniques are employed for such purpose. For outdoor, all-weather surveillance, continuous wave (CW) radar often is used since it is much less susceptible to inclement weather conditions such as heavy rain, fog, and snow than the other techniques. Examples of CW radar intrusion detection systems are to be found in U.S. Pat. Nos. 3,242,486—Corbell; 3,859,656—Klein et al; and 3,803,599—McLean et al. A major operational deficiency of many prior art CW radar counterintrusion systems is that false alarms are frequently caused by small animals that meander into the surveillance area and by very large moving objects, such as trucks, that move well outside the surveillance area. The principal reason for this deficiency is that currently available radar sensors which are suitable for unattended alarm system applications cannot distinguish among any of the following:

1. Small objects that are moving in close proximity to the sensor, inside the surveillance area;
2. Large objects moving a relatively long distance well outside the boundary of the surveillance area; and
3. A person entering the threshold of the surveillance area.

This inability to distinguish objects often occurs because the sensing mechanism is sensitive to and operates on the amplitude of the radar echo received from a moving object, which can be the same amplitude for a very small object at short distances or a very large object at a long distance.

A prior art solution to part of this problem of false alarms is disclosed in U.S. Pat. No. 3,815,131—Dautel et al which discloses a two-sensor system in which the surveillance area is located between the two sensors which are mounted facing each other. To avoid interference, the sensors operate at different frequencies. Also, the antennas are designed so as to suppress side and back lobes. Outputs from the sensors are combined in an AND gate whereby only when a target is detected by both sensors will an alarm be initiated. Thus, if a small animal or bird comes close to one of the sensors it will be detected only by that particular sensor since it is too far from the opposite sensor, and no alarm will be initiated. Similarly, a large vehicle moving some distance away in the field of one sensor may be detected by that sensor but is less likely to be detected by the opposite sensor since it is in the suppressed side- or back-lobes thereof. Hence, no alarm is initiated. A major disadvantage of such an arrangement is that there remain significant areas in the detection geometry where energy reflected from large reflecting objects will be detected by both sensors causing false alarms. Examples are: (a) where a chain-link security fence is running parallel to the axis of the sensors and the fence is vibrated by the wind and (b) when large vehicles, such as trucks, move parallel to the sensing axis.

SUMMARY OF THE INVENTION AND OBJECTS

An object of this invention is the provision of intrusion detection method and apparatus for detecting and signaling an alarm at the earliest possible time upon encroachment of a surveillance area by a person but which are not subject to false alarms from persons or vehicles moving outside the surveillance area or by small animals and birds moving close to sensors included therein.

An object of this invention is the provision of an improved continuous wave radar sensor system for intrusion detection which in addition to providing a Doppler signal in response to movement of an object in a surveillance zone also provides a range, or distance, signal for use in distinguishing between objects of different size and distance from the system.

This object will be apparent to those skilled in the art, in that, the use of continous wave, as opposed to pulsed-doppler or frequency modulated continuous wave techniques, achieves the highest possible rejection of signals caused by strong reflections from near-by fixed (non-moving) objects such as the ground and nearby structures; there being an approximate factor of 100 times (20 dB) better rejection of fixed-object "clutter", using continous wave, over the best attainable using other techniques. Hence, a much larger area of surveillance is possible for any given sized object to be detected.

The above and other objects and advantages of this invention are achieved by use of first and second continous wave Doppler systems each having a radiation field covering a surveillance area. The antenna for the second system is located above the antenna for the first system which is substantially at ground level. A distance data signal is produced in response to Doppler output signals from the first and second systems, which distance data signal is proportional to the distance of a moving object from the first system. This distance data signal, together with Doppler frequency and amplitude data obtained from the Doppler output signal from at least one of the Doppler systems, are used to distinguish between objects of different size and for producing alarm only when an object of predetermined size is sensed within a surveillance area or volume.

BRIEF DESCRIPTION OF THE DRAWINGS

The above and other objects and advantages of this invention will become apparent from the following description considered with the accompanying drawings. In the drawings, wherein like reference characters refer to the same parts in the several views:

FIG. 1 is a simplified block diagram showing an intrusion detection system embodying the present invention;

FIG. 2 is a diagrammatic plan view taken along line 2—2 of FIG. 1;

FIG. 3 is a block diagram showing details of a transmitting system of a type which may be used in the system shown in FIG. 1;

FIG. 6 is a plot of $1/(1-\cos\theta)$ as a function of range for use in explaining the operation of the distance measuring means shown in FIG. 5;

FIG. 7 is a block diagram showing details of a modified form of distance measuring means employing analog processing, which may be employed in the system shown in FIG. 1;

FIG. 8 is a plot showing $\log_2(1/(1-\cos\theta))$ as a function of range for use in explaining operation of the systems shown in FIGS. 7 and 9;

FIG. 9 is a simplified block diagram showing another embodiment of this invention employing digital processing of data by means of a digital computer.

Figure 4:
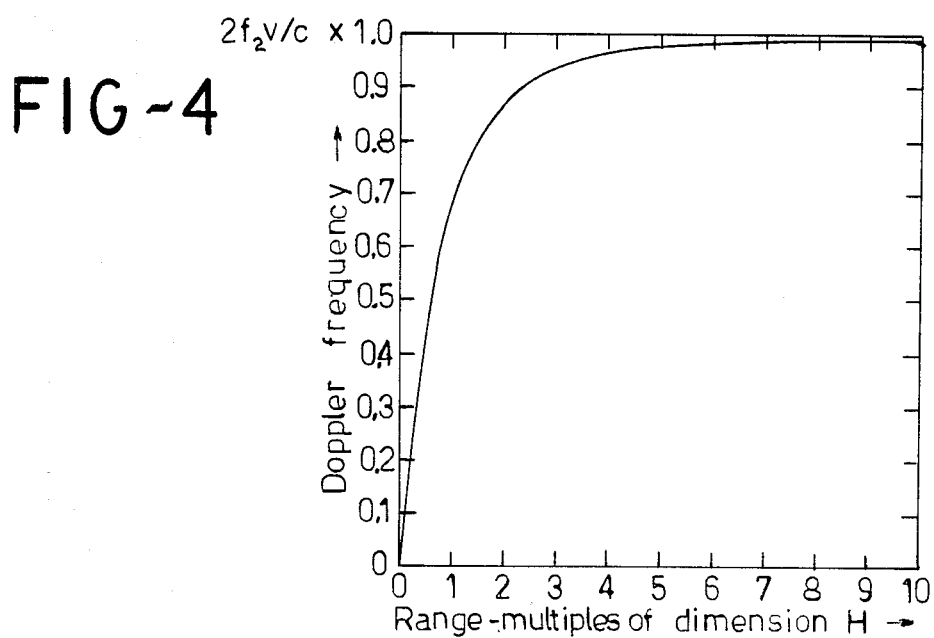
FIG. 4 is a plot of Doppler frequency as a function of range for the elevated CW Doppler system shown in FIG. 1.

Reference first is made to FIG. 1 of the drawings wherein the intrusion detection system is shown to include first and second transmitting-receiving antennas 10 and 12. Antenna 10 is shown located at substantially ground level for transmission of radio frequency energy along a beam axis 14 extending substantially parallel to the ground. A beam pattern 15 for antenna 10 is shown in the plan view of FIG. 2. Second antenna 12 is located above antenna 10 on a suitale support 16, and radiation from antenna 12 is directed downwardly such that the beam 18 overlaps the beam from antenna 10. Beam patterns 15 and 18 are illustrative only, the directivity of antennas employed in the system not being critical to the operation thereof. Non-directional antennas could be employed if desired, so long as the beam patterns overlapped within the surveillance area.

As will become apparent hereinbelow, the system is adapted for detecting moving objects within a surveillance area, in the overlapping beam volume, and for discriminating between moving objects of different characteristics, such as size, where by an alarm may be signaled only when objects with particular characteristics are detected. For purposes of description only and not by way of limitation, system operation for detecting and signaling an alarm if a person, or persons, intrudes into the surveillance area will be described. With this system, no alarm is signaled in response to signals produced by small animals and birds moving close to the sensing antennas, or by large targets, such as vehicles, moving outside a predetermined surveillance area.

The Doppler transceiver associated with antenna 10 comprises a transmitter 20 which includes a transmitter operating at radio frequency $f_1$. Energy from the transmitter is coupled to the antenna through a circulator 22, and energy from the antenna 10 is coupled through the circulator 22 to a mixer 24 for mixing, or heterodyning, with received signals from the antenna. Reflected energy from fixed, non-moving, objects in the vicinity have the same frequency $f_1$ as the transmitted wave and, hence, when the two signals are mixed the resultant frequency is zero. Waves reflected from moving objects are shifted in frequency according to Doppler's principle, and when the direct and reflected signals are mixed at mixer 24 the difference between the two frequencies appears at the output of the mixer. The Doppler frequency is directly proportional to the radial velocity of the target.

In FIG. 1 a target 26 is shown moving along the ground toward the surveillance area. With antenna 10 located at substantially ground level, the illustrated vertical angle $\theta_1$ between the antenna axis 14 and a line between the target 26 and antenna 10 is substantially zero at any position of the target.

The signal frequency, i.e. Doppler difference frequency, detected at the output of mixer 24 is given by $$f_d = (2f_1 v/c)\cos\theta_1 \quad (1)$$

where:

$f_1$ is the operating frequency of the transmitter (Hz);

v is the radial velocity of the moving target 26 (meters/second);

c is the propagation velocity of wave (e.g. for electromagnetic waves $3\times10^8$ meters/second); and $\cos\theta_1$ is the cosine of the angle $\theta_1$ shown in FIG. 1.

Since the angle $\theta_1$ is substantially zero, the cosine is substantially equal to unity and, therefore for any sensor-to-target range (distance) the Doppler difference frequency, $f_d$, is a function only of the radial velocity (i.e., given that the transmitted frequency, $f_1$, and the velocity of propagation, c, remain constant).

The signal power received by the radar is proportional to $$P = AK/R^4 \quad (2)$$

where:

A is the radar cross section of the target;

K is a contant for the radar dependent upon power radiated, antenna gain, frequency, and the like; and R is the slant range from the radar to the target.

The second CW radar associated with the elevated antenna is of the same type as the ground level radar and is shown to include also a transmitter 30, circulator 32 and mixer 34. To avoid interference between the lower and upper Doppler radars, they are operated at two different frequencies. At radar frequencies, in, say, the gigahertz frequency range, only a relatively small difference in operating frequencies is required to avoid interference. In the arrangement of FIG. 1 the transmitter 30 is shown operating at frequency $f_2$, different from $f_1$.

As mentioned above, the Doppler difference frequency produced by the lower, ground level, radar is substantially independent of distance of the object 26 from the antenna; the angle $\theta_1$ being substantially constant and equal to zero regardless of distance. However, for the elevated sensor, the Doppler difference frequency measured at antenna 12 is dependent upon the angle $\theta_2$ which, in turn, is dependent upon the distance of the target 26 therefrom.

It will be seen, then, that the Doppler frequency output from mixer 24 is proportional to the radial velocity, v, of the intruder 26 whereas the Doppler frequency output from mixer 34 is proportional to a combination of the radial velocity, v, and changes in the angle $\theta_2$. In FIG. 1, the output from mixer 24 is labeled $2f_1 v/c$ (plus amplitude variations), ($\cos\theta_1$ being substantially 1 since $\theta_1$ is substantially equal to zero), and the output from mixer 34 is labeled $(2f_2 v/c)\cos\theta_2$ (plus amplitude variations).

Outputs from the mixers 24 and 34 are supplied to distance measuring means 40 having an output which is proportional to the distance from the sensors of objects moving on the ground, such as intruder 26. Circuitry for processing the mixer outputs to obtain a measure of range of objects moving on the ground is described in detail hereinbelow. For present purposes, it will be noted that the distance, or range, data from distance detecting means 40 is supplied to a data processor 42 for processing with Doppler frequency and signal amplitude data from at least one of the sensors. In FIG. 1, the output from mixer 24 of the lower sensor is shown supplied to Doppler frequency and amplitude detecting means 44-1 having outputs proportional to the amplitude and to the Doppler frequency of the input signal from the mixer 24. The amplitude and frequency data signals from 44-1 are supplied to the data processor 42 for processing with the distance data. Under certain conditions of distance, amplitude, and frequency data signal inputs, the data processor provides an output signal to an alarm circuit 46 for signaling the presence of an intruder in the surveillance area.

If desired, the mixer 34 output may be processed to obtain amplitude and Doppler frequency data signals therefrom, which may be processed along with the distance data from distance measuring means 40 and the amplitude and Doppler frequency data from Doppler frequency and amplitude detecting means 44-1. In FIG. 1, a second Doppler frequency and amplitude detecting means 44-2 is shown for processing the mixer 34 output and producing amplitude and Doppler frequency data which is supplied to the processor 42. Doppler frequency and amplitude detecting means responsive to Doppler difference frequency signals from mixers for producing outputs proportional to the Doppler frequency and to the amplitude thereof are well known and require no additional description or disclosure.

To prevent the upper and lower sensors from interfering with one another, they are operated at two different frequencies. It is also desirable that the relationship between the operating frequencies of the sensors remain constant so that as frequency drifts with temperature, or the like, the upper and lower operating frequencies will drift together. One way of accomplishing this is illustrated in FIG. 3, to which Figure reference now is made. There, a high frequency oscillator 50 is shown which operates at a frequency $f_H$ near the desired operating frequencies of the two radar systems. A second, low frequency, oscillator 52 operating at frequency $f_L$ is provided, and outputs from the two oscillators are connected to a balanced mixer 54. For purposes of illustration only, and not by limitation, oscillator frequencies $f_H$ and $f_L$ of, say, 1600 MHz and 16 MHz, respectively, may be employed. Sum and difference frequency signals are provided at the output from the balanced mixer 54, here, 1600+16 MHz (1616 MHz) and 1600−16 MHz (1584 MHz). Band-pass filters 56 and 58 separate the two frequencies, and the lower frequency signal $f_1$ is supplied to circulator 22 while the higher frequency signal $f_2$ is supplied to circulator 32, for transmission to the associated antennas 10 and 12, respectively. By use of a double-balanced mixer 54 the input frequency signals $f_H$ and $f_L$ are eliminated from the mixer output. The operating frequencies of the two sensors are sufficiently different to avoid interference between the two radar systems. However, the frequencies are sufficiently close to frequency $f_H$ so as to produce Doppler difference frequencies substantially the same as would be produced by independent operation of the upper and lower radar systems at frequency $f_H$. Thus, as seen in FIG. 2, the Doppler difference frequency output from mixer 24 is $$2f_1 v/c \cong 2f_H v/c \quad (3)$$

and the Doppler difference frequency output from mixer 34 is $$(2f_2 v/c)\cos\theta_2 \cong (2f_H v/c)\cos\theta_2 \quad (4)$$

Reference now is made to FIG. 4 wherein a plot of the Doppler difference frequency as a function of range for the elevated sensor is shown. There, range is shown in multiples of the elevation height H. From FIG. 4, it will be apparent that for an object moving along the ground at a distance of approximately 4 H or greater, the Doppler difference frequency at the elevated sensor is substantially the same as that at the lower sensor. However, as the range decreases, the Doppler difference frequency at the upper sensor, relative to the Doppler difference frequency at the lower sensor, decreases rapidly, in theory reaching zero when the moving object is directly beneath the elevated antenna 12.

Figure 5:
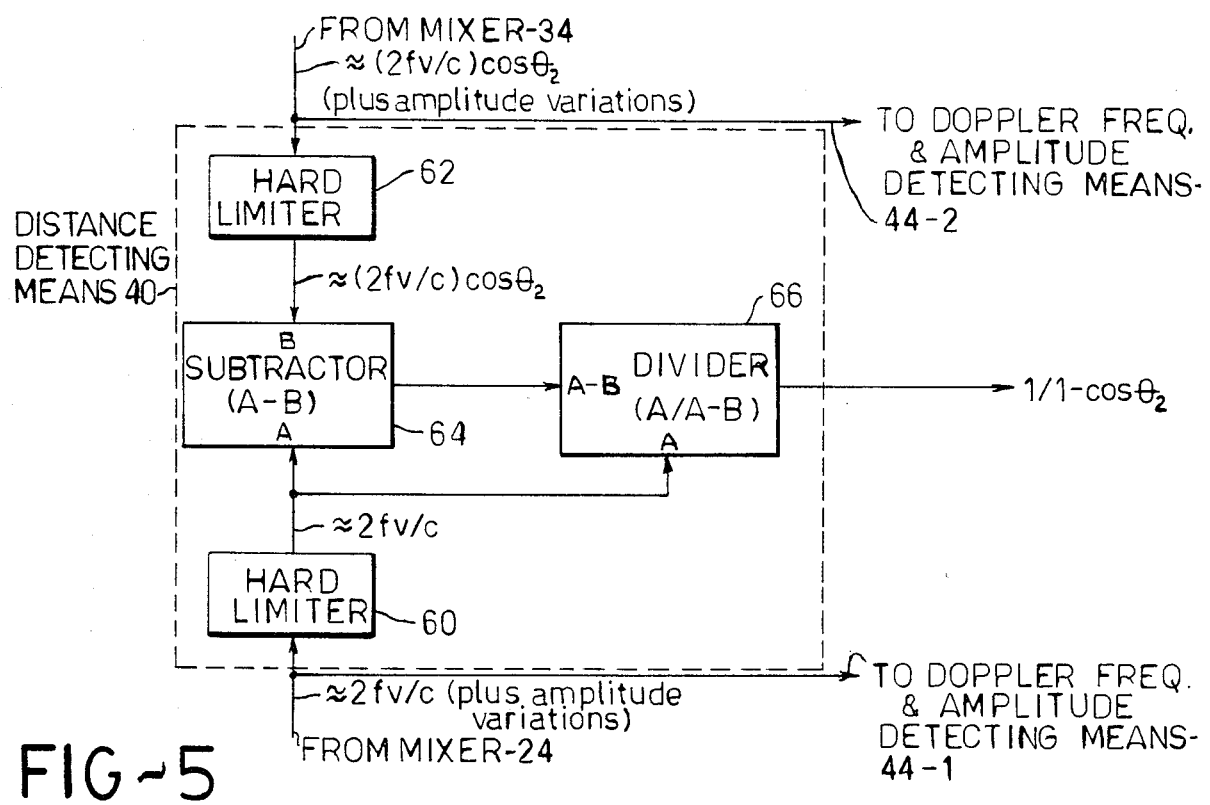
FIG. 5 is a block diagram showing details of distance measuring means of the type which may be employed in the system of FIG. 1.

Details of a distance detecting means 40 for processing Doppler difference signals from the mixers 24 and 34 to produce a signal proportional to distance now will be described with reference to FIG. 5. Where the above-described system of FIG. 3 is employed for frequency separation, Doppler difference frequency outputs from mixers 24 and 34 are, approximately $2f_H v/c$ and $(2f_H v/c)\cos\theta_2$, respectively. For simplicity, the subscript H is deleted from FIG. 5 and the following description.

The outputs from the mixers 24 and 34, which vary in amplitude, are supplied to hard limiters 60 and 62, respectively. With hard limiting, substantially constant amplitude output signals with Doppler difference frequencies of $2fv/c$ and $(2Cfv/c)\cos\theta_2$ are provided at the respective limiter outputs. The limiter outputs are supplied to a subtractor 64 where the limiter 62 outputs is subtracted from that of limiter 60, as follows:

$$2fv/c - (2fv/c)\cos\theta_2 = (2fv/c)(1-\cos\theta_2) \quad (5)$$

The output from the subtractor 64, together with the limiter 60 output, is supplied to a divider 66 where the limiter output is divided by the subtractor output, as follows:

$$\frac{(2fv/c)}{(2fv/c)(1-\cos\theta_2)} = \frac{1}{1-\cos\theta_2} \quad (6)$$

From equation (6) it is seen that the divider 66 output is proportional to $\cos\theta_2$ which, as seen in FIG. 1 is proportional to distance of the moving object 26 from the sensors. FIG. 6 shows a plot of $1/1-\cos\theta_2$ as a function of range, in which range again is identified in multiples of height H. Plotted on the log-log scales of FIG. 6, the function is seen to be substantially linear between ranges of 1H to 20H.

As shown in FIG. 1, and described above, range information from distance detecting means 40 is supplied to the data processor 42 together with Doppler difference frequency and/or signal amplitude data from at least one of the sensors. With the addition of target range data, the processor 42 is able to discriminate wanted from unwanted targets, thereby reducing the number of false alarms produced, for example, by the detection of very large objects outside the surveillance area. It here will be noted that accurate range measurements are not required for discriminating between certain targets. Approximate range data are all that is required to identify targets well outside and inside the surveillance area.

As an example only, and not by way of limitation, the novel intrusion detection system of this invention may be used for detection of persons within a surveillance area extending between, say, 20 and 100 feet from the ground antenna 10. For this surveillance area, the elevated antenna 12 would be mounted between, say 20 to 30 feet off the ground, above antenna 10. For the detection of a moving person within the surveillance area, detection criteria would be stored in the data processor 42 in the form of signals identifying unique combinations of amplitude, range and speed signals which a person moving in the surveillance area might produce. Combinations of amplitude, range and speed signals not matching the selected combinations would not trigger an output from the processor 42. For example, a relatively large amplitude signal received from a small animal moving at close range would not be mistaken for a person because the expected amplitude for a moving person at such close range would be much larger. Similarly, even if a strong echo signal is received, if the detected range is well beyond the limits of the surveillance area, the signal can be discounted as having been generated by a large target, such as a vehicle or truck, moving outside the surveillance area. It will be apparent that the present invention is not limited to any particular detection criteria. With different criteria, the system could be used for detecting, say moving vehicles within a predetermined range, small moving animals, or the like, while discriminating against targets having other characteristics. Clearly, a large number of detection criteria may be employed, as desired, for processing the range, amplitude and Doppler frequency signals, for distinguishing targets having different characteristics and sounding an alarm only when certain targets are identified.

The range, Doppler frequency, and amplitude data signals may be processed using either analog or digital techniques. In either case, some form of memory is required in the processor 42. If the processing is accomplished by analog techniques, the memory may be in the form of selected amplifier bandwidths, threshold settings, feed back loops, comparator circuits, or the like. A digital processor, on the other hand could have memory in the form of storage registers where the criteria for decision for signaling an alarm could be stored. It will be seen, then, that conventional circuitry may be employed for storing detection criteria and for checking the stored values against actual signal values related to distance, amplitude and Doppler difference frequency in the processor 42 for determining the conditions under which an alarm is to be actuated.

Reference now is made to FIG. 7 of the drawings wherein distance measuring means 40-1 employing analog signal processing is shown in block diagram form. There, Doppler difference signals approximately equal to $2fv/c$ (plus amplitude variations) and $(2fv/c)\cos\theta_2$ (plus amplitude variations) from the mixers 24 and 34 are shown supplied to limiters 60 and 62, respectively, for removal of amplitude data, leaving only frequency information. The limiter outputs are applied to a difference amplifier 70 to obtain the difference thereof.

The output form the difference amplifier 70 and the limited signal from limiter 60 are converted to logarithamic form by logarithmic converters, or amplifiers, 72 and 74, respectively. The logarithmic values are supplied to a second difference amplifier circuit 76 to obtain the difference therebetween. The subtraction of the two values, in logarithmic form, yields the quotient thereof, in logarithmic form. Thus, the output from the difference amplfier is in the form $\log_2(1/(1-\cos\theta_2))$. FIG. 8 shows a plot of $\log_2(1/(1-\cos\theta))$ as a function of range, in multiples of H. (If desired, this output may be supplied to an antilog circuit for generating the antilog, $1/(1-\cos\theta_2)$, thereof.) It will be seen that the logarthmic function from difference amplifier 76 is proportional to distance of the target, or intruder, from the radar sensors. This output, or the antilog thereof, is supplied to the decision circuits of the data processing means, such as processor 42, where it is combined with amplitude and/or Doppler frequency data from one or both radar sensors in the decision process described above.

As noted above, digital processing of data also is possible, and an example of a digital processing system is illustrated in FIG. 9, to which figure reference now is made. The outputs from mixers 24 and 34 are supplied to cycle counters 80 and 82, respectively. Timing and control means 84 establishes the interval over which the cycle counters count the cycles of the signals from the mixers. At the end of the cycle time the contents of the cycle counters are transferred to a digital computer 86.

At the computer, distance data is derived from the counter outputs by subtracting the output of counter 82 from the output of counter 80. The result of the subtraction then is supplied to a matrix, or look-up table, in the computer 86 for conversion to binary logarithm form. Similarly, the output from the counter 80 is onverted to binary logarithm form as by use of the matrix or look-up table. Then, by subtraction of difference signal, in logarithmic form, from the counter 80 output, in logarithmic form, the function $\log_2(1/(1-\cos\theta_2))$ is obtained, a plot of which is shown in FIG. 8.

Amplitude data also is derived from Doppler difference signals from the mixers 24 and 34 by supplying the mixer outputs to amplitude detectors 88 and 90, respectively, comprising, for example, rectifier-filter combinations. Analog to digital converters 92 and 94 convert the amplitude data into digital form for use by the digital computer 86. As described above, detection criteria is stored in the digital computer 86 for comparison with the calculated distance data and the amplitude data from the analog to digital converters 92 and 94. Combinations of data matching the stored criteria data result in an output from the computer for triggering the alarm 46.

Figure 10:
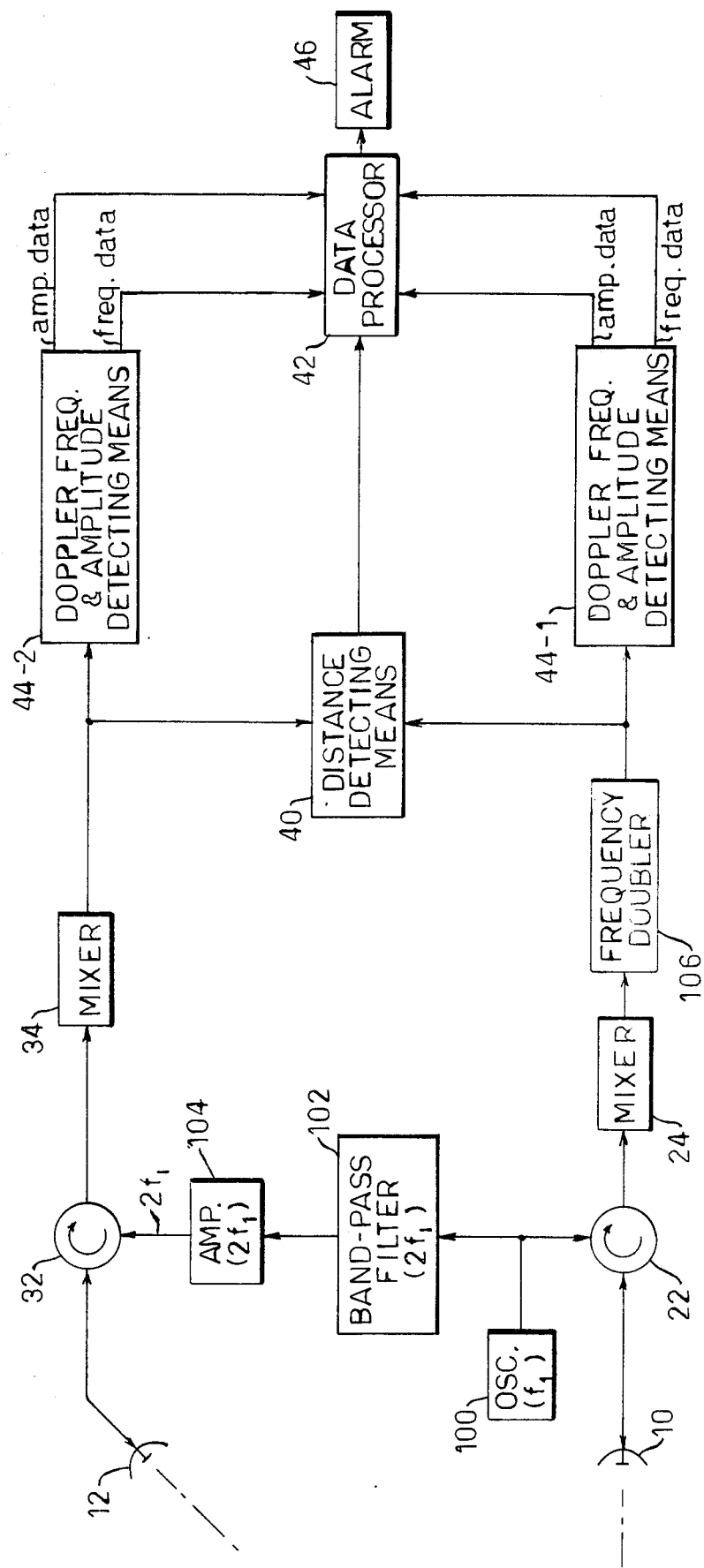
FIG. 10 is a block diagram showing details of a modified form of intrusion detection system embodying the present invention.

Another method providing frequency separation while maintaining a constant relationship between the operating frequencies of the two radar systems employed in the present CW intrusion detection system of this invention is illustrated in FIG. 10, to which figure reference now is made. There, a single oscillator 100 is employed operating at a frequency $f_1$. The oscillator output is supplied to antenna 10 through circulator 22 for transmission from the antenna 10. The output from the oscillator 100 also is supplied to a band-pass filter 102 tuned to the second harmonic frequency $2f_1$ of the oscillator. The output from the band-pass filter is amplified by amplifier 104 and the amplified output is supplied to the circulator 32 for transmission from antenna 12.

The signal received by antenna 12, and a portion of the output signal from amplifier 104, are supplied to the mixer 34 through the circulator 32, from which mixer the Doppler difference signal for the upper radar is obtained. Similarly, the signal received by antenna 10 is mixed at mixer 24 with a sample from the oscillator 100, from which mixer the Doppler difference frequency signal for the lower radar is obtained. The frequency of the mixer 24 output is doubled at frequency doubler 106 to produce a compatible signal to that from mixer 34. Outputs from frequency doubler 106 and mixer 34 are processed in the manner described above to derive distance and amplitude data therefrom for discriminating detection of intruders.

The invention having been described in detail in accordance with requirements of the Patent Statutes, various other changes and modifications will suggest themselves to those skilled in this art. For example, the invention is not limited to use with the illustrated monostatic radars. Instead, a bistatic configuration may be employed for either radar, or for both radars. Also, the present system is well adapted for use in conjunction with, or as a part of, other intrusion detection systems. For example, the present system may be combined with the system shown in the above-mentioned Dautel et al U.S. Pat. No. 3,815,131 by the addition of a third radar at the opposite side of the surveillance area and facing antenna 10. The output from this additional sensor could be easily processed by the data processor. Also, although means for deriving distance data as a function of $1/(1-\cos\theta_2)$ (see FIGS. 5 and 6) or as a function of $\log_2(1/(1-\cos\theta_2))$ (see FIGS. 7, 8 and 9), the invention is not limited to use of such functions. Obviously, with the Doppler frequency signals available from the two sensors other functions, such as $\cos\theta_2$ and $1-\cos\theta_2$ could readily be derived and employed in the present system. It is also apparent that the invention can be implemented using acoustic or other wave energy as well as the radio frequency energy implementation described hereon. Additionally, it here will be noted that the above-described system can be "confused" by the presence of multiple targets. For example, if two or three people attempt to intrude at the same time from different approaches, the system cannot sort-out the complex echo signals and the processing of distance breaks down. However, since the amplitude of the signals in both sensors is preserved, a rule built in to the detection process (or algorithm) will be provided so that in the event that there are relatively strong signals in both sensors (above some predetermined level) the system will automatically go into alarm. This rule also provides a countermeasure against an intruder trying to enter the detection field by using a large reflecting object (corner reflector or large flat reflecting plate) held over his head so as to introduce equally strong signals into both sensors. It is intended that the above and other such changes and modifications shall fall within the spirit and scope of the invention as defined in the appended claims.

I claim:

1. In an intrusion detection system for detecting the presence of an intruder moving along the ground in a surveillance area, the combination comprising, a first Doppler radar system comprising first antenna means at a first level adjacent ground level having a radiation pattern for illuminating the surveillance area and providing a first Doppler difference frequency signal in response to movement of an intruder in said surveillance area, a second Doppler radar system comprising second antenna means having a radiation pattern for substantially illuminating said surveillance area from a spaced position substantially directly above said first antenna and providing a second Doppler difference frequency signal in response to movement of an intruder in said surveillance area, the first Doppler difference frequency remaining substantially constant while the second Doppler difference frequency decreases upon approach of an intruder at a substantially constant radial velocity with respect to said first antenna means, and means responsive to said first and second Doppler difference frequency signals for generating a signal proportional to distance of a moving intruder from at least one of said first and second antenna means.

2. In an intrusion detection system as defined in claim 1 including, means responsive to said signal proportional to distance and to at least one of said first and second Doppler difference frequency signals for producing an alarm signal dependent upon predetermined characteristics of signals supplied to said alarm producing means.

3. In an intrusion detection system as defined in claim 1 wherein said first and second Doppler radar systems are of the continuous wave type and operate at different transmission frequencies.

4. In an intrusion detection system as defined in claim 3 including a single oscillator from which both transmission frequencies are derived whereby a constant relationship is maintained therebetween.

5. In an intrusion detection system as defined in claim 4 wherein the transmission frequencies of said first and second Doppler radar systems are within approximately 30 MHz of each othere, and both are in the gigahertz range.

6. In an intrusion detection system for detecting the presence of a moving intruder in a surveillance area, the combination comprising, a first Doppler radar system comprising first antenna means at a first level adjacent ground level having a radiation pattern for illuminating the surveillance area and providing a first Doppler difference frequency signal in response to movement of an intruder in said surveillance area, a second Doppler radar system comprising second antenna means having a radiation pattern for substantially illuminating said surveillance area from a position above said first antenna and providing a second Doppler difference frequency signal in response to movement of an intruder in said surveillance, and means responsive to said first and second Doppler difference frequency signals for generating a signal proportional to distance of a moving intruder from at least one of said first and second antenna means, said means for generating a signal proportional to distance comprising, means for subtracting one of said first and second Doppler difference frequency signals from the other of said first and second Doppler difference frequency signals to obtain a difference signal, and means responsive to said difference signal and to one of said first and second Doppler difference frequency signals for dividing one of said signals by the other thereof to produce said output proportional to distance.

7. In an intrusion detection system as defined in claim 6 wherein said second Doppler difference frequency signal is subtracted from said first Doppler difference frequency signal at said subtracting means, and said first Doppler difference frequency signal is divided by said difference signal from said subtracting means at said dividing means.

8. In an intrusion detection system as defined in claim 6 wherein said means for generating a signal proportional to distance also includes, limiter means for amplitude limiting said first and second Doppler difference frequency signals before application thereof to said subtracting and dividing means.

9. In an intrusion detection system as defined in claim 8 wherein said limiter means provides hard limiting action of the first and second Doppler difference frequency signals.

10. In an intrusion detection system for detecting the presence of a moving intruder in a surveillance area, the combination comprising, a first Doppler radar system comprising first antenna means at a first level adjacent ground level having a radiation pattern for illuminating the surveillance area and providing a first Doppler difference frequency signal in response to movement of an intruder in said surveillance area, a second Doppler radar system comprising second antenna means having a radiation pattern for substantially illuminating said surveillance area from a position above said first antenna and providing a second Doppler difference frequency signal in response to movement of an intruder in said surveillance area, said first and second Doppler radar systems being of the continuous wave type and operating at different transmission frequencies, the transmission frequency of one of said first and second Doppler radar systems being twice that of the other, said system including a single oscillator from which both transmission frequencies are derived whereby a constant relationship is maintained therebetween, and means responsive to said first and second Doppler difference frequency signals for generating a signal proportional to distance of a moving intruder from at least one of said first and second antenna means.

11. In an intrusion detection system for detecting the presence of a moving intruder in a surveillance area, the combination comprising, a first Doppler radar system comprising first antenna means at a first level adjacent ground level having a radiation pattern for illuminating the surveillance area and providing a first Doppler difference frequency signal in response to movement of an intruder in said surveillance area, the radiation pattern of said first antenna means including an axis substantially parallel to and adjacent the ground, the second Doppler radar system comprising second antenna means having a radiation pattern for substantially illuminating said surveillance area from a position above said first antenna and providing a second Doppler difference frequency signal in response to movement of an intruder in said surveillance area, the radiation pattern of said second antenna means including a downwardly directed axis which substantially intersects the radiation pattern axis of said first antenna, and means responsive to said first and second Doppler difference frequency signals for generating a signal proportional to distance of a moving intruder from at least one of said first and second antenna means.

12. In an intrusion detection system as defined in claim 11 wherein said second antenna means is located substantially directly above said first antenna means.

13. In an intrusion detection system for detecting the presence of an object moving along the ground in a protected area, the combination comprising, first means for producing first Doppler difference frequency signals in response to a moving object within a first radiated energy field, second means for producing second Doppler difference frequency signals in response to said moving object within a second radiated energy field which overlaps said first radiated energy field, said first and second Doppler difference frequency signal producing means including first and second antenna means, respectively, one of which is located substantially directly above the other, said first and second Doppler difference frequency signals being related in amplitude and frequency to characteristics of said moving object, the frequency of said first Doppler difference frequency signals being substantially directly related to radial velocity of the moving object relative to said first antenna means, and the frequency of said second Doppler difference frequency signals being substantially directly related to radial velocity of the moving object relative to said first antenna means times a trigonometric function of an angle formed between lines extending from said moving object to said first and second antenna means.

14. In an intrusion detection system as defined in claim 13 wherein the trigonometric function comprises the cosine of said angle.

15. In an intrusion detection system as defined in claim 13 including means responsive to said first and second Doppler difference frequency signals for producing a signal proportional to distance of the moving object from said first means for producing first Doppler difference frequency signals.

16. In an intrusion detection system as defined in claim 15 including means responsive to said first Doppler difference frequency signals and to said signal proportional to distance for producing an alarm signal dependent upon predetermined characteristics of said signals.

17. A method of detecting an object moving along the ground within a protected area using first and second Doppler radar systems which include first and second antenna means, respectively, said method comprising, establishing said first antenna means of said first Doppler radar system at a substantially ground level position, establishing said second antenna means of said second Doppler radar system at a position a spaced distance from and substantially directly above said first antenna means, using said first radar system, illuminating the protected area with wave radiation at a first frequency and obtaining first Doppler difference frequency signals in response to movement of an object along the ground in the area illuminated, the first Doppler difference frequency being substantially directly related to the radial velocity of the moving object relative to said first antenna means, using said second radar system, illuminating the protected area with wave radiation at a second frequency and obtaining second Doppler difference frequency signals in response to said moving object, the second Doppler difference frequency being substantially directly related to the radial velocity of the moving object relative to said first antenna means times a trigonometric function of an angle formed between lines extending from said moving object to said first and second antenna means, and deriving from said first and second Doppler difference frequency signals a distance signal proportional to distance of the moving object from said first antenna means.

18. A method of detecting an object as defined in claim 17 including, generating an alarm signal when said signal proportional to distance and at least one of said unlimited Doppler difference frequency signals meet predetermined criteria.

19. A method of detecting an object moving along the ground within a protected area using first and second Doppler radar systems which include first and second antenna means, respectively, said method comprising, establishing said first antenna means of said first Doppler radar system at a substantially ground level position, establishing said second antenna means of said second Doppler radar system at a position a spaced distance from and substantially directly above said first antenna means, using said first radar system, illuminating the protected area with wave radiation at a first frequency and obtaining first Doppler difference frequency signals in response to movement of an object along the ground in the area illuminated, using said second radar system, illuminating the protected area with wave radiation at a second frequency and obtaining second Doppler difference frequency signals in response to said moving object, and deriving from said first and second Doppler difference frequency signals a distance signal proportional to distance of the moving object from said first antenna means, said deriving step comprising hard limiting said first and second Doppler difference frequency signals, subtracting one of said hard limited signals from the other thereof to obtain a difference signal, and dividing one of said hard limited first Doppler difference frequency signal and difference signal by the other thereof to obtain said distance signal.

20. A method of detecting an object moving along the ground within a protected area using first and second Doppler radar systems which include first and second antenna means, respectively, said method comprising, establishing said first antenna means of said first Doppler radar system at a substantially ground level position, establishing said second antenna means of said second Doppler radar system at a position a spaced distance from and substantially directly above said first antenna means, using said first radar system, illuminating the protected area with wave radiation at a first frequency and obtaining first Doppler difference frequency signals in response to movement of an object along the ground in the area illuminated, using said second radar system, illuminating the protected area with wave radiation at a second frequency and obtaining second Doppler difference frequency signals in response to said moving object, deriving from said first and second Doppler difference frequency signals a distance signal proportional to distance of the moving object from said first antenna means, and generating an alarm signal when said signal proportional to distance and at least one of said unlimited Doppler difference frequency signals meet predetermined criteria, said criteria including amplitude of said signal proportional to distance and at least one of said unlimited Doppler difference frequency signals.

* * * * *